United States Patent [19]

Buck

[11] Patent Number: 4,753,063
[45] Date of Patent: Jun. 28, 1988

[54] HAY RAKING IMPLEMENT

[76] Inventor: George A. Buck, Rte. 1 Box 12, Purdon, Tex. 76679

[21] Appl. No.: 927,516

[22] Filed: Nov. 6, 1986

[51] Int. Cl.⁴ .......................................... A01D 78/14
[52] U.S. Cl. ...................................... 56/377; 56/370
[58] Field of Search ................. 56/377, 370, 344, 228, 56/15.9, 15.5; 172/456, 311, 459

[56] References Cited

U.S. PATENT DOCUMENTS

| | | | |
|---|---|---|---|
| 2,975,582 | 3/1961 | Pollard | 56/377 |
| 2,993,327 | 7/1961 | Van der Lely et al. | 56/377 |
| 3,108,424 | 10/1963 | Van der Lely et al. | 56/377 |
| 3,151,431 | 10/1964 | Daugherty | 56/377 |
| 3,546,869 | 12/1970 | Weaver | 56/377 |
| 3,650,333 | 3/1972 | Fueslein | 172/456 |
| 3,692,121 | 9/1972 | Kenney | 172/456 |
| 4,077,189 | 3/1978 | Hering | 56/377 |
| 4,183,198 | 1/1980 | Sligter | 56/377 |
| 4,214,428 | 7/1980 | Caraway | 56/377 |

*Primary Examiner*—Paul J. Hirsch
*Assistant Examiner*—Vincent Ciamacco
*Attorney, Agent, or Firm*—Drude Faulconer

[57] ABSTRACT

An implement for raking hay which can be quickly mounted on either a wide front wheel vehicle or a narrow front wheel vehicle and operated in either a front operating position or a side operating position.

11 Claims, 2 Drawing Sheets

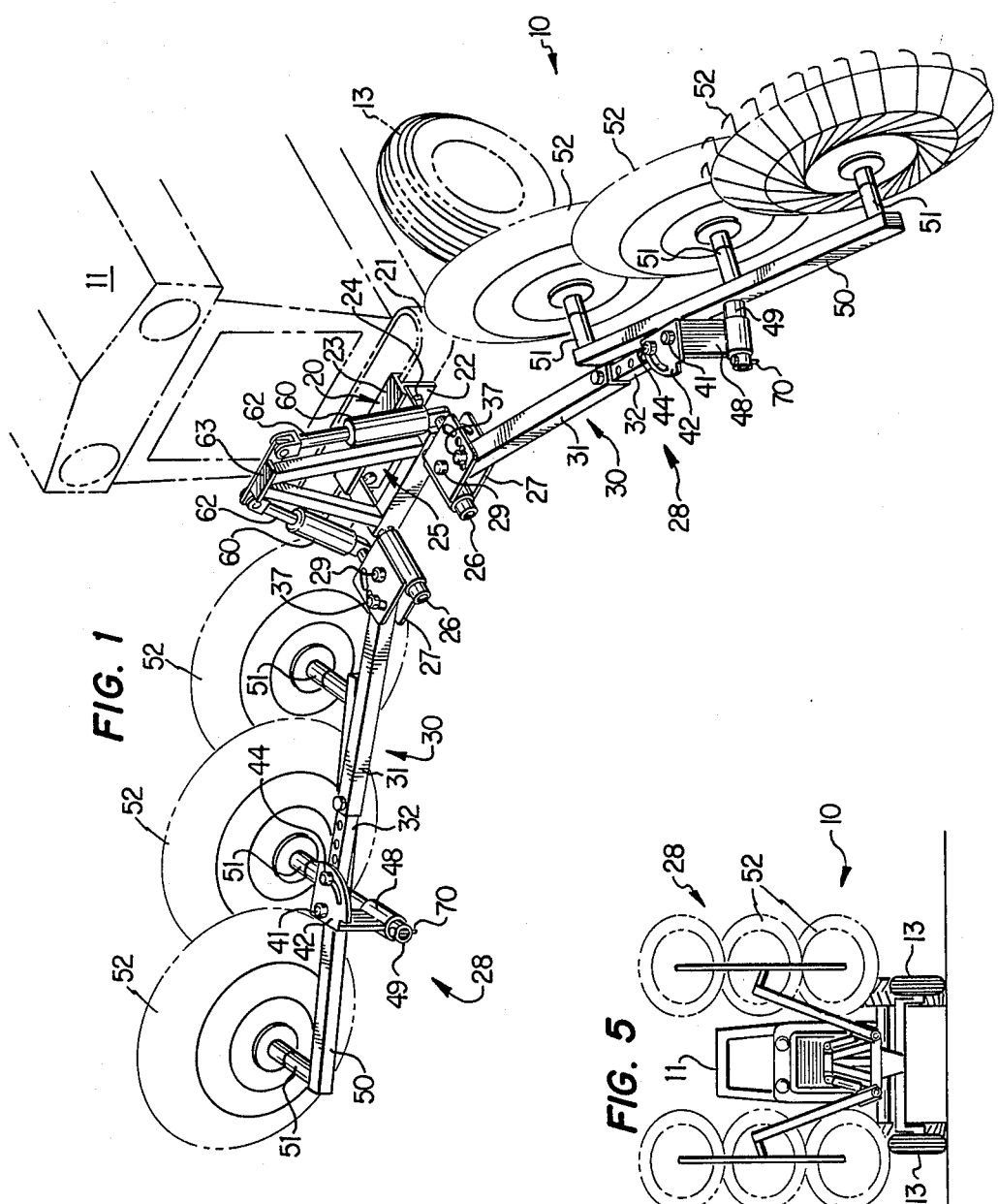

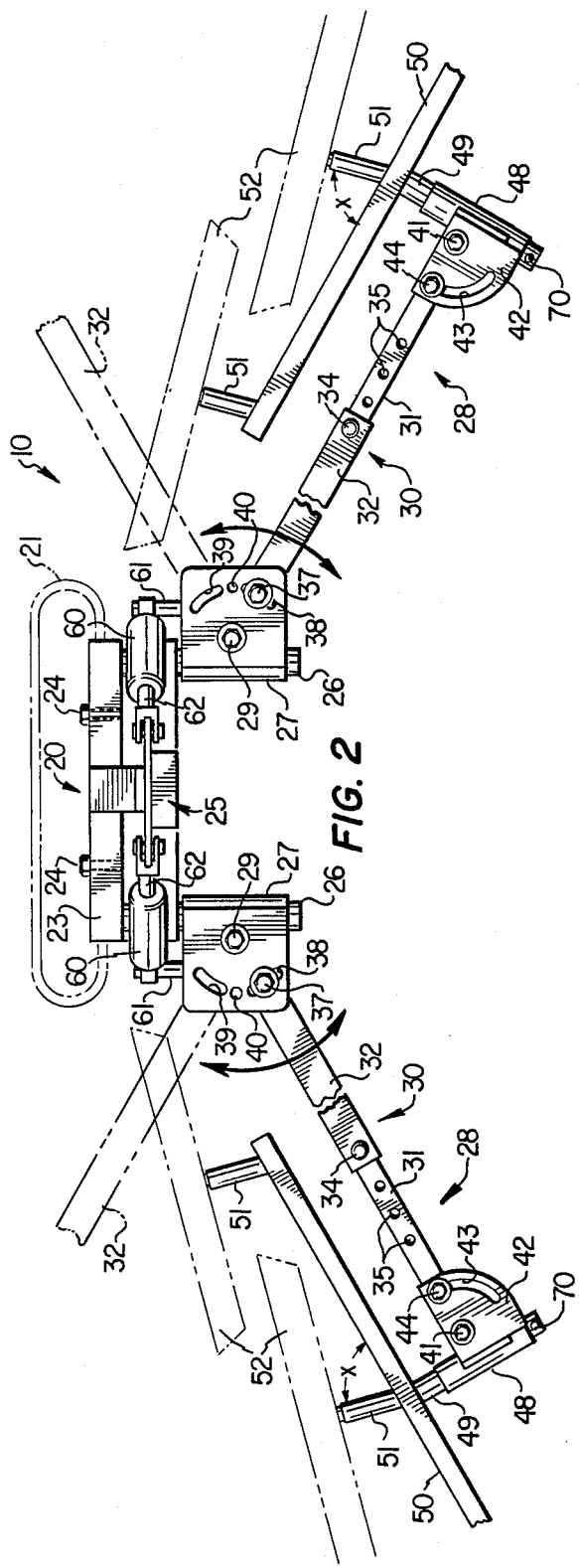
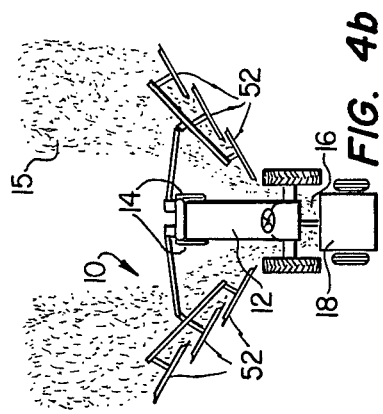
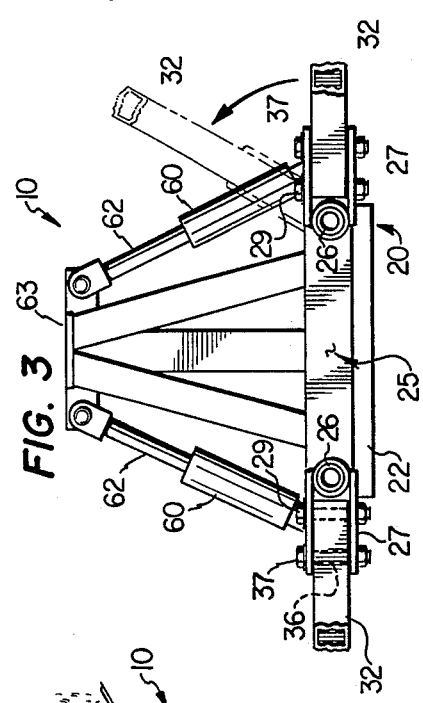
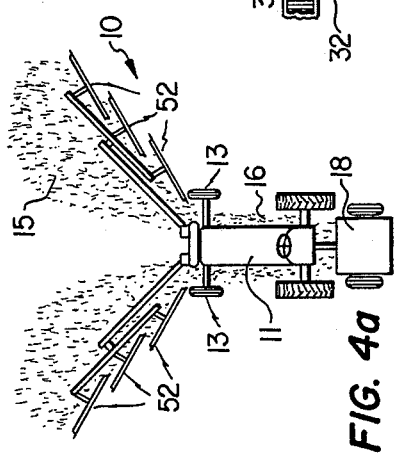

4,753,063

HAY RAKING IMPLEMENT

DESCRIPTION

1. Technical Field

The present invention relates to an implement for raking hay or the like and more particularly relates to a universal rake implement that is easily mounted on the front of both wide and narrow front wheel tractors and other farm vehicles, e.g. hay rollers, and which is capable of being quickly adjusted between a front or a side operating position for a particular raking operation.

2. Background Art

In typical hay baling operation, the hay is cut and left on the ground to dry. It is then raked into windrows over which a baling machine is passed to pick up and bale the hay. In many such operations, raking implements are used which are mounted on the rear of a tractor or are towed there behind. The use of such rear-positioned rake implements require one or more individual passes over a field to accomplish just the raking operation and still another pass for the baling operation. In addition, more than one tractor is usually needed and additional field hands are required thereby substantially adding to the costs involved.

In order to overcome some of the drawbacks associated with rear-positioned rake implements, several types of rake implements have been proposed which mount onto the front or the side of a tractor. For example of such implements, see U.S. Pats. Nos. 2,459,961; 2,486,766; 2,819,578; 2,929,187; 2,938,324; 2,945,339; 2,975,582; 3,125,845; 3,149,450; and 4,077,189. While all of these implements will obviously rake hay, most still require at least one individual pass over the field just to rake the hay and a separate pass by the baling machine. Also, each of these implements are designed to operate with a single, particular type of vehicle and are not interchangeable between certain farm vehicles. That is, most of these rake implements are designed for use only with tractors having front wheels which are narrowly spaced from each other thereby requiring the hay to be raked into windrows along side of the tractor. Further, all of these implements require special mounting brackets or other substantial modifications of the vehicle on which they are to be mounted and all require substantial time and effort for assembly and removal.

Recently, another type of rake implement has been proposed which mounts on the front of a tractor which has widely spaced front wheels. This type of implement rakes a wide swath of hay into a single windrow between the tractor wheels where it is picked up by a baling machine which, in turn, is being towed by the same tractor; see U.S. Pat. No. 4,214,428. This allows the raking and baling passes to be combined thereby substantially reducing the costs of the baling operation. However, this implement is designed for use only with a wide front wheel tractor and can not be used on the many narrow front wheel tractors now in wide spread use in typical farming operations.

Further, the implement disclosed in U.S. Pat. No. 4,214,428 must be mounted on a tractor which already has an expensive commercial "front end loader" attachment thereon. This attachment is not standard on a large number of farm tractors now in use. However, the front end loader attachment is absolutely necessary in order to raise the disclosed implement to a transport position so that it will not have to be removed when the tractor is moved to a new field. However, even with the front end loader attachment, several additional manipulative steps and additional restraints, e.g. chains, are required to secure the implement for transport thereby requiring the operator to manually adjust several components before raising the implement and again before resuming raking operations in a new location.

In view of the above, it can be seen that a need exists for a universal rake implement that can be mounted and removed easily and quickly on most commonly used farm vehicles, e.g. both wide and narrow front wheel tractors, certain hay baling machines, etc., without requiring any substantial modifications or any special, expensive attachment, e.g. front end loaders.

DISCLOSURE OF THE INVENTION

The present invention provides a rake implement that can be easily and quickly installed on several different farm vehicles, e.g. commerically-available farm tractors, hay roller machines, etc. The rake implement is adjustable so that it may operate in a front position when mounted on a tractor or vehicle having widely spaced front wheels or in a side position when mounted on a tractor or vehicle having narrowly spaced front wheels. This permits a single, universal rake implement to be manufactured and stocked by distributors rather than having to have several different rake implements for several different vehicles.

Also, the present implement is self-contained in that the means for lifting the implement to a transport position is an integral part of the implement, itself, thereby eliminating the need for any separate, expensive implements, (e.g. front end loader attachment,) for its use. The present rake implement also preferably mounts on a support that is normally already present on the front of most commercial farm vehicles. That being the support on the front of a tractor for mounting removable weights that, in turn, balance the tractor and keep the front wheels thereof on the ground during operation or it may be the tongue of a hay roller vehicle. This allows the implement to be mounted quickly on most commonly available tractors and hay rollers without any substantial modifications being required.

More specifically, the rake implement of the present invention is comprised of a mounting means for mounting the implement to the front of a vehicle. A frame having a pair of parallel, horizontal axle pins extending therefrom is affixed to the mounting means. Right and left adjusting brackets are rotatably positioned on the pins and each carry a rake assembly. Each rake assembly is comprised of an extendable arm which is pivotably connected to an adjusting bracket whereby it can be moved between a forward position (when rake implement is in front operating position) and a rearward position (when rake implement is in side operating position).

An adjusting means is pivotably connected to the outer end of each arm and has a journal sleeve thereon to which a wheelrake mounting bar is rotatably secured. The bar has a plurality of wheel mounts spaced thereon to which a plurality of finger wheelrakes are mounted. The rake assemblies are adjusted forward when the implement is used with vehicles having widely spaced front wheels and rearward when the implement is used with vehicles having narrowly spaced front wheels. This allows the wheelrakes to roll along in contact with the ground to rake a wide swath of hay on either side of the vehicle into a neat windrow between the rear wheels of the vehicle. This permits a baler or roller to be towed by the same vehicle to pick up and bundle the hay in the windrow during the same pass over the field.

Hydraulic cylinder means are provided on the frame to rotate the adjusting brackets about the axle pins to raise and lower the rake assemblies. When the rake assemblies are in a raised position, the hydraulic cylinders will effectively lock them in position whereby the rake implement can easily be transported on the vehicle to a new field. The raised rake assemblies will readily pass through standard sized gates normally found in most fences. Once at the new field, the hydraulic cylinders are actuated to lower the assemblies and the implement is now ready to resume raking operations.

BRIEF DESCRIPTION OF THE DRAWINGS

The actual construction, operation, and apparent advantages of the present invention will be better understood by referring to the drawings in which like numerals identify like parts and in which:

FIG. 1 is a perspective of the hay rake implement of the present invention shown in a front operating position.

FIG. 2 is a top view of the hay rake implement of FIG. 1;

FIG. 3 is a front view, partly broken away, of the hay rake implement of FIG. 1;

FIG. 4a is a simplified top view of the hay rake implement of FIG. 1 mounted on a wide front wheel vehicle and in a front operating position;

FIG. 4b is a simiplified top view of the hay rake implement of FIG. 1 mounted on a narrow front wheel vehicle and in a side operating position; and FIG. 5 is a simpilied view of the hay rake implement of FIG. 1 mounted on a vehicle and in a raised or transport position.

BEST MODE FOR CARRYING OUT THE INVENTION

Referring more specifically to the drawings, FIGS. 1,2, and 3 disclose a hay rake implement 10 which can easily and quickly be mounted or removed on a farm vehicle. While rake implement 10 is illustrated as being mounted on a farm tractor 11 (FIGS. 1,4a, 5) having widely spaced front wheels 12 and on a farm tractor 13 (FIG. 4b) having narrowly spaced front wheels 14, it should be understood that rake implement may equally as well be mounted on other towed or self-propelled vehicles, e.g. on the tongue of a commercially-available hay roller. The purpose of rake implement 10 is to rake large swathes of hay 15 into a central windrow 16 (FIGS. 4a and 4b) so that it can be picked up and baled by baling or roller machine 18 which is pulled by the same tractor 11 or 13, respectively, as that on which implement is mounted. By raking and baling with the same tractor and on the same pass, considerable time and expense is saved.

Hay rake implement 10 is comprised of mounting means 20 which is adapted to be mounted on the front of a farm vehicle, e.g. tractor 11. It should be recognized that the actual construction of mounting means 20 may vary slightly depending on the particular vehicle on which implement 10 is to be mounted. However, most farm tractors in use today have a bracket 21 on the front thereof to which one or more removable weights (not shown) can be attached to help balance the tractor and keep the front wheels on the ground during certain farming operations. This is true with either wide and narrow front wheel tractors.

Preferably, mounting means 20 is comprised of plate 22 having a lip 23 running along the upper edge thereof which fits over the upper surface of weight mounting bracket 21. Bolts 24 or the like are used to secure plate 22 to bracket 21.

Frame 25 is secured to plate 22 by welding or the like and has two spaced horizontal axle pins 26 extending from the front thereof. Rotatably mounted on each pin 26 is an adjusting bracket 27 to which an individual rake assemby 28 is pivotably mounted by bolt 29. Since each assembly 28 are substantially identical except for being "right" and "left" oriented, only one will be described in detail. Each assembly 28 is comprised of an arm 30 which, in turn, is comprised of an outer element 31 which is telescopically positioned within inner element 32. Positioning a pin 34 or like through a hole in element 32 and through one of a plurality of holes 35 in element 31 allows the arm 30 to adjust to a desired length as desired for a particular haying operation.

Inner member 32 is pivotably connected to adjusting bracket 27 by bolt 29 and has an opening 36 (FIG. 3) adapted to receive bolt 37 which, in turn, is manually positioned in arculate groove 38 or arculate groove 39 in bracket 27, depending on whether rake assembly 28 is to be used in a front or a side operating position, as will be explained in greater detail below. An opening 40 in bracket 27 is positioned between arculate grooves 38, 39 and is adapted to receive an additional pin or bolt (not shown) to provide additional support to maintain assembly 28 in either the front or the side position during operation.

Pivotably mounted at the outer end of outer member 31 by bolt 41 is an adjusting member 42 which has an arculate groove 43 therein. Bolt 44 is positioned through groove 43 and into an opening in inner element 31 to secure member 42 in a selected angular position on element 31. A journal sleeve 48 is attached to the front of member 42 and extends downwardly therefrom and is adapted to rotatably receive an axle shaft 49 which, in turn, is attached to the midpoint of bar 50. Bar 50 has a plurality (three shown) of wheel mounts 51 the centerlines of which are canted rearwardly with respect to the centerline of bar 50 at an angle X of about 15° (FIG. 2).

Journalled on each wheel mount 51 is a fingerwheel rake 52 of the type that is driven by contact with the ground. Preferably wheel rakes 52 (e.g. 45 inches diameter) are of the type as those commercially—available from GZG Farm Machinery Industry of Riviganno, Italy. While three wheel rakes 52 are shown mounted on bar 50 it should be understood that bars having two or some other number of wheel rakes can be used as desired, depending on a particular haying operation.

A power cylinder means 60 (e.g. hydraulic cylinders) is rotatably mounted to pin 61 (FIG. 3) on adjusting bracket 27 and has a piston rod 62 which is pivotably mounted to the upper portion 63 of frame 25 as clearly shown in the drawings (FIG. 3) for a purpose to be described below. The structural details of rake implement 10 having now been described, the installation and operation thereof will now be set forth.

Rake implement 10 is easy to install on a typical farm vehicle. Frame 25 having adjusting brackets 27 mounted on axle pins 26 and hydraulic cylinders 60 in place is installed on the farm vehicle, e.g. wide front wheeled tractor 11 or narrow front wheel tractor 12 or hay rollers, by positioned lip 23 of plate 22 over weight mount 21 on tractor 11 and securing same by bolts 24 Operating lines (not shown) for cylinders 60 are connected to the hydraulic assist outlet commonly found on tractors of this type. Arms 30 may already be secured to adjusting brackets 27 by bolts 29 or they can be secured thereto after frame 25 is secured to the vehicle. Adjusting members 42 are normally already assembled on arms 30 and after the frame and arms are in place, shaft 49 of each bar 50 with wheelrakes 52 mounted thereon is rotatably positioned through its respective journal 48 and held therein by bolt 70 (FIG. 1).

For wide front wheeled tractors, rake implement 10 is normally operated in a front operating position as shown in FIGS. 1, 2, and 4a. In this position, arms 30 are rotated forward about bolts 29 and are secured by tightening bolts 37 in grooves 38. Arms 30 can then be adjusted to their desired lengths by aligning particular openings in element 31 with the opening in element 32 and adjusting members 42 are rotated about bolts 41 to angularly align bars 50, and hence, wheelrakes 52 for a particular rake operation. Cylinders 60 are extended to rotate adjusting brackets 27 downward about axle pins 26 to lower rake assemblies 28 whereby wheelrakes 52 rest on the ground.

Since bars 50 can rotate about shafts 49 in journals 48, the wheelrakes 52 will follow the terrain as they are moved thereover. The contact of the fingers on wheelrakes 52 with the ground cause the rakes to turn which, in turn, rakes hay from the front or outermost wheelrake 52 to the next inner rake and so on. It has been found by canting the wheel mounts 51 on bar 50 at an angle X of approximately 15°, hay does not collect or "clog" about the axles of wheelrakes 52 (especially the inner ones) as is found to be the case with bars having wheel mounts at right angles thereto.

Where implement 10 is to be used with a narrow front wheeled tractor, implement 10 will be operated in a side operating position (FIG. 4b). In this case, implement 10 is installed in the same manner as above except bolts 29 are loosen, bolts 37 are removed from groove 38, arms 30 are moved rearward, and bolts 37 are positioned and tightened within groove 39. Further adjustments of arms 30 and adjusting members 42 are made as required to angularly align assemblies 28 for a particular side raking operation.

Rake implement 10 can be raised and secured for transport by merely retracting cylinders 60 to rotate brackets 27 upward around axle pins 26 to raise rake assemblies 28 to the position shown in FIG. 5. This can be done while the assemblies are in either a front or a side operating position. The operator does not have to leave the cab of the tractor to accomplish this task. This allows the tractor with the attached implement to be quickly moved from field to field, through relative narrow gates, and to resume raking operations in a new area by merely actuating cylinders 60 to again lower assemblies 28 into their operable position.

What is claimed is:

1. A rake implement comprising:
   means for mounting said rake implement on a vehicle;
   a frame secured to said mounting means;
   a pair of brackets;
   means for pivotably mounting each of said brackets on said frame for rotation about parallel, horizontal axes thereon;
   a pair of arms;
   means for pivotably mounting the inner end of each of said arms to a respective said bracket for rotation about a vertical axis thereon whereby said arms can be moved between a forward and a rearward position with respect to said bracket;
   means on the outer end of each of said arms for mounting a plurality of wheelrakes comprising:
   a member pivotably mounted on said outer end of said arm for rotation about a vertical axis;
   journal means affixed to said member;
   a bar having a plurality of wheel mounts spaced along its length;
   means to mount said bar in said journal means; and
   means for mounting one of said plurality of wheelrakes at each of said plurality of said wheel mounts; and
   means on said frame for rotating said brackets about said parallel horizontal axes to raise and lower said arms.

2. The rake implement of claim 1 wherein said means for mounting said rake implement comprises:
   a plate adapted to be mounted on the weight mounting support on the front of a commercial farm tractor.

3. The rake implement of claim 1 including:
   means for adjusting the length of each of said arms.

4. The rake implement of claim 1 wherein the centerline of each said wheel mounts is canted at a rearward angle of about 15° with respect to the longitudinal centerline of said bar.

5. The rake implement of claim 4 wherein said means on said frame for rotating said brackets comprises:
   hydraulic cylinder means.

6. A rake implement comprising:
   mounting means for mounting said rake implement on a vehicle;
   a frame secured to said mounting means, said frame having a right and a left axle pin extending horizontally outward from the front of the said frame;
   a right bracket rotatably positioned on said right axle pin;
   a left bracket rotatably positioned on said left axle pin;
   a rake assembly secured to said right bracket;
   a rake assembly secured to said left bracket; each of said rake assemblies comprising:
   an arm secured at its inner end to each said respective bracket;
   pivot means for adjusting each said arm relative to its respective bracket, each said arm being pivotable about its respective said pivot means between a forward position and a rearward position whereby said rake assemblies will be in a front operating position when said arms are in said forward position and will be in a side operating position when said arms are in said rearward position;
   a journal means secured to the outer end of said arm;
   a bar having a shaft thereon, said shaft rotatably positioned within said journal means; and
   a plurality of wheelrakes mounted on each of said bars; and
   lift means on said frame and attached to said right and left brackets for rotating said right and left brackets about their respective axle pins to raise or lower said rake assemblies.

7. The rake implement of claim 6 wherein said journal means comprises:
   an adjusting member pivotably secured to said outer end of said arm and adapted to pivot about a relative vertical axis; and a journal sleeve affixed to said adjusting member.

8. The rake implement of claim 7 wherein said shaft is positioned at the midpoint of said bar and wherein said bar includes:
- a plurality of wheel mounts positioned along said bar, the centerline of each of said wheel mounts being canted at a rearward angle of about 15° with respect to the longitudinal centerline of said bar; and
- means for mounting each of said plurality of said wheelrakes on a respective one of said wheel mounts.

9. The rake implement of claim 8 wherein said arm comprises:
- an inner element pivotably secured at one end of said adjusting bracket;
- an outer element telescopically positioned within said inner element; and
- means to secure said inner and outer elements at one of several different positions relative to each other whereby the length of said arm is adjustable.

10. The rake implement of claim 9 wherein said lift means comprises:
- hydraulic cylinder means connected between said frame and each of said brackets.

11. The rake implement of claim 10 wherein said mounting means comprises:
- a plate adapted to be mounted on the weight mounting support on the front of a commercial farm tractor.

* * * * *